Oct. 9, 1923.

F. W. MANNING 1,470,463

DRAINAGE PLATE FOR FILTERS

Filed June 7, 1920

Inventor:
Fred W. Manning
By Rummler & Rummler
Attys.

Patented Oct. 9, 1923.

1,470,463

UNITED STATES PATENT OFFICE.

FRED W. MANNING, OF CHICAGO, ILLINOIS.

DRAINAGE PLATE FOR FILTERS.

Application filed June 7, 1920. Serial No. 387,016.

*To all whom it may concern:*

Be it known that I, FRED W. MANNING, a subject of the King of Great Britain, and a resident of Chicago, county of Cook, and State of Illinois, have invented certain new and useful Improvements in Drainage Plates for Filters, of which the following is a specification.

This invention relates to drainage elements intended particularly for use in pressure operated filtering apparatus of the general type described in my co-pending applications for patents, Serial Nos. 324,507, and 365,537, filed September 18, 1919, and March 13, 1920, respectively.

The type of machine for which the drainage plate shown is particularly designed, comprises a rotary drum through which liquid is filtered under pressure. The drum is rotated during operation, so that solid matter extracted from the liquid may be evenly distributed over the filtering medium in order to insure a uniform filtering action. The liquid travels outward toward the shell of the drum adjacent to which is a fine mesh wire cloth supported by a crimped or corrugated drainage plate, providing channels along which the liquid may flow longitudinally of the drum to one end. A compartment is provided at this end of the drum to receive the filtrate, the discharge being through a hollow centrally located pipe.

The objects of the invention are to provide a drainage plate which will properly support the filtering cloth against the weight and pressure of the contents of the drum; and to provide suitable unobstructed longitudinal channels for the filtrate to flow along after it passes through the cloth. Drainage members made from woven wire or wire mesh, while applicable in the stated type of apparatus, have certain disadvantages in use which it is an object of the present invention to obviate. The longitudinal flow passages offered by wire mesh held tightly against the inner periphery of the drum are tortuous and offer a certain amount of obstruction and frictional resistance to the flow of liquid; and moreover they tend to collect solids passing through the filter cloth and the like. With the class of liquids ordinarily treated in these machines, the first filtrate is apt to run through cloudy and the fine particles passing the filter cloth or the like are held back by the wires to a certain extent, prolonging the period of cloudy filtrate; and the accumulations may build up with the ultimate result of partial or complete obstruction of flow.

The drainage plate of the present invention consists of a foraminous crimped or corrugated plate of arcuate shape with longitudinal crimps or corrugations made alternately from opposite sides of the plate so that in position the flow passages made by the corrugations shall be longitudinal of the drum, the parts between the apices of the crimps being flat so as to provide triangular flow passages of maximum strength and resistance against deformation. That is, the corrugations are of straight-sided V-shape rather than of the usual wavy or curved sided form, which would have a greater tendency to flatten or deform under pressure. The perforations in the corrugated plate are elongated or slot-like and made to extend in a direction transverse to the corrugations, and are so distributed that all the channels on the outer face of the plate may receive the proper proportion of liquid, and thus permit a maximum flow in the passages provided.

The objects of the invention are accomplished by the device shown in the accompanying drawings, in which—

Figure 1:
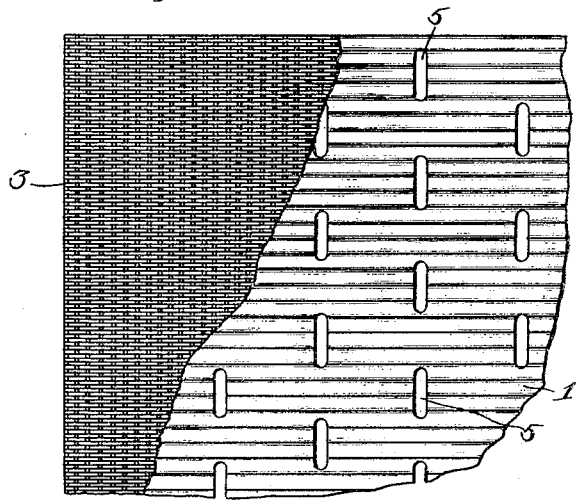
Fig. 1 shows in plan view part of the drainage plate having on its surface a fragment of the filtering cloth shown as of metallic fabric.
Figure 2:
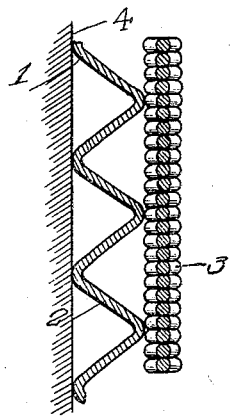
Fig. 2 is a fragmentary longitudinal sectional view on an enlarged scale of the drainage plate and filtering cloth in position in the drum.
Figure 3:
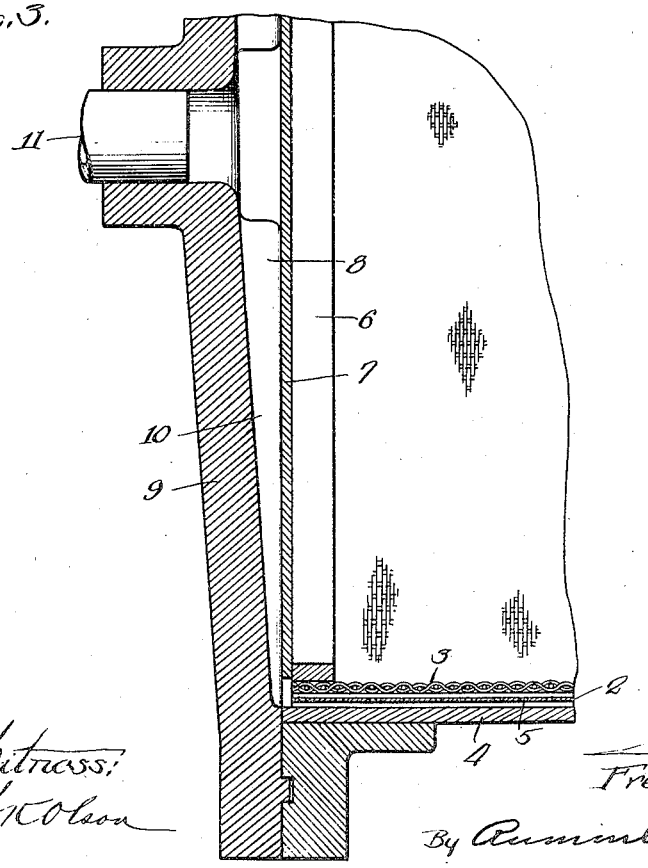
Fig. 3 is a fragmentary detail in longitudinal section showing further detail of the application of the drainage element to a rotary pressure filter.

In the construction shown, the drainage plate 1 is crimped or corrugated as appears in Fig. 2, the walls 2 of the corrugations being straight, except at the meeting points, where they are sharply curved or angled.

The filter cloth 3 in this manner is supported by a comparatively strong angular structure to properly withstand pressure and maintain the filter cloth at the desired distance from the shell 4 of the drum.

In the usual dimensions of these plates, the pitch of the crimps is advantageously about one-fourth of an inch and the depth of crimp is about one-eighth of an inch. Slots 5 in the drainage plates 1 under the present invention are usually located about three-fourths of an inch apart longitudinally of the drum and are made to extend about three-eighths of an inch transversely of the axis of the drum, these perforations being elongated in this direction and are three-eighths of an inch long by three thirty-seconds wide. The transverse rows of perforations are placed in staggered relation, so that liquid flowing in the channels between the drainage plate and the filtering cloth will in its path along the drainage plate pass over and through the perforations at desired intervals.

The filter cloth and drainage plate are held against the shell 4 of the drum by expansion rings 6. An end wall 7 spaced away somewhat from the end of the drum, is located between the end expansion ring 6 and radial ribs 8 on the head 9 of the drum. The filtrate flows from the longitudinal passages afforded by the crimps of the drainage plate around the edge of end-plate 7 into the space 10 between this plate and the head cover 9, the discharge being through the pipe 11.

In the operation of the device, the liquid from which it is desired to separate solid matter is subjected to considerable pressure, which in conjunction with rotation of the drum causes the solid matter to be evenly distributed over the filtering medium and the liquid to be forced through the filtering cloth.

The filtrate travels toward the end of the drum along the longitudinal channels formed by the corrugated plate 1, some of the filtrate traveling in the inner channels, while part of it passes through the perforations into the outer channels.

Although but one specific embodiment of this invention has been herein shown and described, it will be understood that numerous details of the construction shown may be altered or omitted without departing from the spirit of this invention as defined by the following claims.

I claim:

1. In a filtering device, a filter-supporting metal plate longitudinally corrugated to provide longitudinal drainage channels and provided with transverse slots in said corrugations establishing communication between adjacent channels, the corrugations being of straight-sided V-shaped sectional form.

2. A drainage member comprising a foraminous corrugated plate, the corrugations being of straight-sided V-shaped sectional form, and the perforations being elongated transversely of the corrugations.

3. In a pressure operated filter, a filter cloth and filter cloth support, a drainage element separating said cloth and support, said drainage element being a longitudinally corrugated plate provided with slots transverse of the corrugations and establishing communication between adjacent channels formed by said corrugations.

4. A filter, comprising a rotary drum, a filter cloth adjacent the inner surface of the drum, a spacer between said cloth and drum, said spacer consisting of a perforated corrugated plate, the corrugations being parallel with the axis of the drum, and the perforations being elongated transversely to the corrugations.

5. A filter, comprising a rotary drum, a filter cloth adjacent the inner surface of the drum a spacer between said cloth and drum, said spacer consisting of a perforated corrugated plate the corrugations being parallel with the axis of the drum, and the perforations being elongated transversely to the corrugations, in staggered relation in the direction of the axis of the drum.

Signed at Chicago this 3d day of June 1920.

FRED W. MANNING.